US012716211B2

(12) United States Patent
Junck et al.

(10) Patent No.: US 12,716,211 B2
(45) Date of Patent: Aug. 25, 2026

(54) SYSTEM, METHOD, AND COMPUTER PROGRAM PRODUCT FOR DETERMINING WORK IMPLEMENT WEAR, DAMAGE, OR CHANGE

(71) Applicant: Caterpillar SARL, Geneva (CH)

(72) Inventors: Christopher Arnold Junck, Hyogo (JP); Carl John Moberg, Hyogo (JP)

(73) Assignee: Caterpillar SARL, Geneva (CH)

( * ) Notice: Subject to any disclaimer, the term of this patent is extended or adjusted under 35 U.S.C. 154(b) by 207 days.

(21) Appl. No.: 18/382,074

(22) Filed: Oct. 20, 2023

(65) Prior Publication Data

US 2025/0129579 A1 Apr. 24, 2025

(51) Int. Cl.
*E02F 9/26* (2006.01)
*E02F 3/32* (2006.01)
*G01G 19/08* (2006.01)

(52) U.S. Cl.
CPC ................ *E02F 9/267* (2013.01); *E02F 3/32* (2013.01); *G01G 19/08* (2013.01)

(58) Field of Classification Search
CPC ............. E02F 9/267; E02F 3/32; G01G 19/08
See application file for complete search history.

(56) References Cited

U.S. PATENT DOCUMENTS 8,660,738 B2 2/2014 Faivre et al.
9,315,970 B2 4/2016 Chitty et al.
9,670,649 B2 6/2017 Bewley et al.
10,339,667 B2 7/2019 Tafazoli Bilandi et al.
10,988,916 B2 4/2021 Paul et al.
11,079,921 B1 8/2021 Worth et al.
2005/0261799 A1* 11/2005 Groth ...................... E02F 3/435 700/180
2015/0112954 A1* 4/2015 Collins ................ G06Q 10/083 707/702

(Continued)

FOREIGN PATENT DOCUMENTS

EP 2511678 A1 * 10/2012 ................ E02F 9/26

OTHER PUBLICATIONS

Written Opinion for Int'l Patent Appln. No. PCT/EP2024/025306, published Apr. 24, 2025, accessed at https://patentscope.wipo.int/search/en/detail.jsf?docId=WO2025082626&_cid=P12-MCZLQ8-10997-1 Jul. 11, 2025 (Year: 2025).*

(Continued)

*Primary Examiner* — Hunter B Lonsberry
*Assistant Examiner* — Harrison Heflin

(57) ABSTRACT

Systems, methods, and computer program products can determine wear, damage, change, or other characteristics of a portion of a front linkage of an excavator. The systems, methods, and computer program products can comprise determining, based on signals from at least one sensor of the excavator, that the excavator is in a predetermined state to weigh at least a portion of the front linkage of the excavator; determining a weight of the portion of the front linkage of the excavator under a condition that the excavator is in the state to weigh the portion of the front linkage of the excavator; determining that the determined weight of the portion of the front linkage is outside of a predetermined weight range; and electronically outputting information regarding a further action to be taken with respect to the portion of the front linkage of the excavator.

18 Claims, 5 Drawing Sheets

(56) References Cited

U.S. PATENT DOCUMENTS

| | | | | |
|---|---|---|---|---|
| 2016/0340865 | A1* | 11/2016 | Takeo | E02F 9/265 |
| 2017/0287124 | A1* | 10/2017 | Lim | G06T 7/74 |
| 2017/0350750 | A1 | 12/2017 | Leslie et al. | |
| 2017/0370075 | A1* | 12/2017 | Leslie | G01G 19/083 |
| 2019/0024345 | A1* | 1/2019 | Thomsen | E02F 9/2029 |
| 2020/0240112 | A1* | 7/2020 | Hendricks | G06Q 50/08 |
| 2021/0262204 | A1 | 8/2021 | Tafazoli Bilandi et al. | |
| 2022/0179394 | A1* | 6/2022 | Zhang | G05B 19/4065 |
| 2025/0089590 | A1* | 3/2025 | Nishikawa | A01B 59/069 |

OTHER PUBLICATIONS

International Search Report for Int'l Patent Appln. No. PCT/EP2024/025306, published Apr. 24, 2025, accessed at https://patentscope.wipo.int/search/en/detail.jsf?docId=WO2025082626&_cid=P12-MCZLQ8-10997-1 Jul. 11, 2025 (Year: 2025).*

* cited by examiner

SYSTEM, METHOD, AND COMPUTER PROGRAM PRODUCT FOR DETERMINING WORK IMPLEMENT WEAR, DAMAGE, OR CHANGE

TECHNICAL FIELD

The present disclosure relates to systems, methods, and computer program products for determining work implement wear, damage, or change.

BACKGROUND

Work tools on a work machine can wear, can be damaged, and can be changed throughout the life of the work machine to which they are connected. It may be challenging for an operator of the work machine to determine excessive wear or damage, and the operator may forget to change the work tool selected in the control system/display when the work took is physically changed. This may result in unexpected down time or inappropriate parameters being used on the work machine.

U.S. Pat. No. 9,315,970 ("the '970 patent") describes a stress and/or accumulated damage monitoring system on earth moving equipment, such as excavators, trucks, electric rope shovels and drills, hydraulic shovels, wheel loaders, and graders. According to the '970 patent, the system includes strain gauges, at one of multiple strain gauge locations, a data acquisition unit to acquire real-time strain data from the strain gauges, a processor and memory to process the acquired real-time strain data to calculate one or more measures of actual accumulated damage and/or actual instantaneous stress, and at least one output device to provide information comparing the measures with corresponding reference values.

SUMMARY

According to an aspect of the present disclosure, a method regarding an excavator can be performed or implemented. The method can comprise determining, based on signals from at least one sensor of the excavator, that the excavator is in a predetermined state to weigh at least a portion of a front linkage of the excavator; determining a weight of the portion of the front linkage of the excavator under a condition that the excavator is in the state to weigh the portion of the front linkage of the excavator; determining that the determined weight of the portion of the front linkage is outside of a predetermined weight range; and electronically outputting information regarding a further action to be taken with respect to the portion of the front linkage of the excavator. The predetermined state can be a state in which a work tool of the front linkage of the excavator is expected to be without any payload.

According another aspect of the present disclosure, a non-transitory computer-readable storage medium having stored thereon instructions that, when executed by one or more processors, causes the one or more processors to perform a method can be performed or implemented. The method can comprise determining, based on signals from at least one sensor of a work machine, that the work machine is in a predetermined state to weigh a work tool of the work machine; determining, automatically and without input by an operator of the work machine, the weight of the work tool under a condition where the work machine is in the state to weigh the work tool; determining that the determined weight of the work tool is outside of a predetermined weight range; and electronically outputting information regarding a further action to be taken with respect to the work tool. Optionally, the predetermined state can be a state in which the work tool is expected to be free of payload. The further action can include one of inspecting the work tool, replacing some or all of the work tool, scheduling replacement of some or all of the work tool, updating one or more parameters corresponding to a different work tool that replaced the work tool associated with the determined weight, or performing a payload discharge operation.

According to yet another aspect of the present disclosure, an excavator can be provided or implemented. The excavator can comprise a lower traveling body; an upper swiveling body operatively coupled to the lower traveling body and configured to swivel relative to the lower traveling body; a front linkage having a first end operatively coupled to the upper swiveling body, the front linkage including a boom, a stick, and a work tool at a second end opposite the first end; a plurality of inertial measurement unit (IMU) sensors, including a first IMU sensor operatively coupled to the upper swiveling body, a second IMU sensor operatively coupled to the boom, and a third IMU sensor operatively coupled to the stick; and circuitry configured to determine that the excavator is in a predetermined state to determine weight of the work tool, the predetermined state being based on a position of the front linkage determined from feedback from the second IMU sensor and the third IMU sensor, and a position of the upper swiveling body determined from feedback from the first IMU sensor, determine the weight of the work tool under a condition where the excavator is in the state to determine the weight of the work tool, determine that the determined weight of the work tool is outside of a predetermined weight range, and electronically output information at the excavator and/or remote from the excavator indicating that a further action is to be taken regarding the work tool based on the weight of the work tool being outside of the predetermined weight range.

DETAILED DESCRIPTION

Embodiments of the present disclosure relate to systems, methods, and computer program products for determining work implement wear, damage, and/or change. Additionally or alternatively, embodiments of the present can related to systems, methods, and computer program products for determining when payload remains in a work tool after a payload dump or disposal operation.

According to one or more embodiments of the present disclosure, utilizing sensors of a work machine that determine front linkage position and payload (e.g., position sensors, IMUs, pressure sensors, etc.), it can be possible to weigh the work tool at one or more appropriate times. This weight can help determine wear, damage, and tool changes. With this information, it can be possible to alert the operator and/or technician appropriately so that either service/replacement can be planned, or the machine settings can be adjusted in the case of a tool change when the operator has forgotten to change the settings. Additionally or alternatively, the determined weight may be used to alert the operator in the case that excessive material is stuck on the work tool, i.e., carryback, which may encourage cleaning and/or work process changes. The weight(s) of the installed work tool(s) and/or candidate work tool(s) for installation can be downloaded, for instance, from a back office system, to the work machine to create an initial wear baseline. Optionally, the weight(s) of other portions of the front linkage, such as a tiltrotor and/or a coupler (e.g., quick coupler), can be downloaded to the work machine to create an initial weight or wear baseline.

In general, some work machines, such as an excavator (e.g., hydraulic excavator), can have an articulated working member configured from rotatable connecting multiple front members. Such articulated working member can be regarded as a front linkage. Moreover, in the work machine having such articulated working member, posture information detection sensor(s) (e.g., IMU (Inertial Measurement Unit)) can be mounted on each of multiple front members constituting the working member (e.g., boom, stick, bucket, quick coupler, etc.) for detecting posture information of each front member. A detection signal from the posture information detection sensor(s) can be input into a controller via an onboard network (wired and/or wireless), and posture of each front member can be calculated using the controller. The calculated posture of the front members can be displayed on a display, such as a monitor, within the work machine and/or external to the work machine, and made use of for movable range restriction and control (e.g., automatic control) of the work machine.

Figure 1:
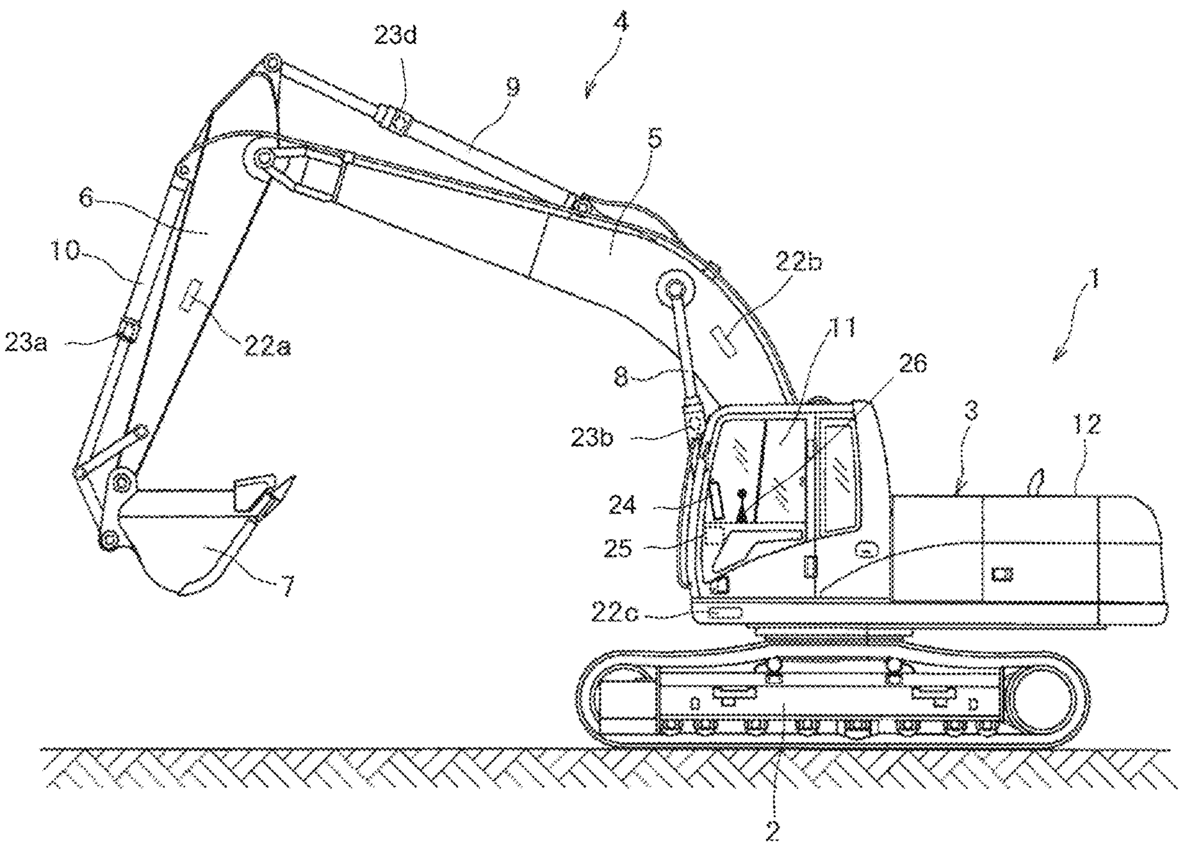
FIG. 1 is a side elevational view of a work machine according to one or more embodiments of the disclosed subject matter.

Turning now to FIG. 1, this figure shows a work machine 1 according to one or more embodiments of the present disclosure. Here, the work machine 1 is a hydraulic excavator, though embodiments of the present disclosure are not so limited. For instance, the work machine 1 can be mobile or non-mobile and may include, but is not limited to, machines (e.g., vehicles) that perform some type of operation associated with a particular industry, such as mining, construction, farming, transportation, forestry, etc. and operate between or within work environments, e.g., construction sites, mine sites, forests, power plants, on-highway applications, marine applications, demolition applications (e.g., grabbing and dumping or demolishing vehicles), etc.

The work machine 1 can include a lower traveling body 2, which may be a crawler- or track-type traveling body; an upper swiveling body 3, which can be operatively coupled to the lower traveling body 2 and configured to swivel relative to the lower traveling body 2; and a front linkage 4, which may be regarded as an articulated working member or machine, having a first end operatively coupled to the upper swiveling body 3.

The lower traveling body 2 can include a drive system, which may include a transmission and ground propelling devices (in a case where the work machine 1 is mobile). The transmission may include any device or group of devices that can transfer force between the power system and the ground propelling devices. The transmission may include one or more of a mechanical transmission, gearing, belts, pulleys, discs, chains, pumps, motors, clutches, brakes, torque converters, fluid couplings, etc. According to one or more embodiments, the propelling device can include tracks. In alternative embodiments the propelling devices may additionally or alternatively include wheels.

According to one or more embodiments of the present disclosure, the front linkage 4 can include a boom 5, a stick 6, and a work implement or tool 7, in this example, a bucket. However, embodiments of the present disclosure are not limited to the front linkage 4 configuration shown in FIG. 1 and may include additional or alternative components, such as a foreboom, an offset boom, a quick coupler, a coupler, tilt rotor, etc. More generally, the front linkage 4, according to embodiments of the present disclosure, can include all components from the boom 5 to the work tool 7 (inclusive of both ends). Optionally, the work machine 1 can have more than one work tool at the same time.

The boom 5 may define or form the first end of the front linkage 4, and may be rotatably coupled to the upper swiveling body 3. The work tool 7 can form a second end of the front linkage 4 opposite the first end at the upper swiveling body 3. The stick 6 can be rotatably coupled to the boom 5 and can be driven in-side (direction coming close to upper swiveling body 3) and out-side (direction going away from upper swiveling body 3) with respect to the supporting part as a fulcrum. The work tool 7 can be rotatably coupled to the stick 6.

The work machine 1 can comprise a traveling motor to move the lower traveling body 2, a swiveling motor for swiveling the upper swiveling body 3, and various hydraulic actuators such as a boom cylinder 8, a stick cylinder 9, and a bucket cylinder 10 for driving the boom 5, the stick 6, and work tool 7, respectively. Note that a pair of boom cylinders 8 may be associated with the boom 5, one on each side of the boom 5 (FIG. 1 shows a boom cylinder 8 on the left side of the boom 5).

A cab 11 as an operating room for an operator and engine room 12 storing various types of equipment such as an engine can be mounted on the upper swiveling body 3. The cab 11 may be regarded as an operator station. A hydraulic system for driving various hydraulic actuators of the work machine 1 can be implemented in the upper swiveling body 3. The engine, which may be an internal combustion engine, may be part of a power system. Additionally or alternatively, the power system may include additional or other power sources, such as electric motors, fuel cells, batteries, ultracapacitors, electric generators, etc.

An operator's seat for the operator, various manipulators for traveling, swiveling, operating the boom 5, the stick 6, and the work tool 7, and a monitor for various displays and settings can be provided in the cab 11. For example, the cab 11 can include an operator interface 24 and a manual control device or devices 26 to control the work machine 1. The operator interface 24 and the manual control device(s) 26 can be operatively coupled to a control system, which may be or include a controller 25. Optionally, one or both of the operator interface 24 and the manual control device(s) 26 may be considered part of the control system. Optionally, the work machine 1 may be remotely controlled from outside the cab 11 or the cab 11 or portion thereof may not be provided for remote control of the work machine 1. Additionally or alternatively, the work machine 1 can operate autonomously or semi-autonomously.

The operator interface 24 may be or include a control panel, for instance, implemented on or as a display device operative to display, for instance, a graphical user interface (GUI) providing some or all of the operator interface 24. Such operator interface 24, according to embodiments of the disclosed subject matter, may be implemented using multiple display devices. A non-limiting example of the manual control device(s) 26 is or includes one or more joysticks, though embodiments of the disclosed subject matter are not so limited. Alternatively, as noted above, the cab 11 (and thus the operator interface 24 and the manual control device(s) 26) may be provided offboard the work machine 1, for instance, at a back office system 150 (see, e.g., FIG. 2).

The manual control device(s) 26 can control rotation of the upper swiveling body 3 relative to the lower traveling body 2. Such rotation may be referred to or characterized as swing, particularly, swing of the work tool 7. The manual control device(s) 26 may also control movement of the front linkage 4 (including portions thereof, such as the work tool 7) relative to the upper swiveling body 3. For instance, the manual control device(s) 26 may be operated to move the work tool 7 to an outermost or most extended position, i.e., as far away from the upper swiveling body 3 as possible. Likewise, the manual control device(s) 26 can be operated to move the work tool 7 to an innermost or least extended position, i.e., as close to the swiveling body 3 as possible as limitations allow. Such movement of the work tool 7 may be characterized as or considered to be in a radial direction. Thus, the work tool 7 can be radially extendable and retractable to and from outermost and innermost positions, respectively. Incidentally, according to embodiments of the disclosed subject matter, dirt or soil or the like (e.g., other fine or granular material), as examples, may constitute the payload for the work tool 7.

The work machine 1 can also include a plurality of sensors, such as an inertial navigation or measurement unit (IMU) 22*a*-22*c*, a plurality of pressure sensors 23*a*, 23*b*, and 23*d*, and a controller 25, which can be implemented in or using circuitry. The controller 25 may be regarded as a control system or part of the control system. Note that each boom cylinder 8 can have a corresponding pressure sensor 23*b*. The work machine 1 may also have a swing angle sensor at the upper swiveling body 3 and/or a work tool angle sensor (e.g., bucket angle sensor) at the work tool 7.

Generally, the sensors 22*a*-22*c* can measure or detect, or can be used to measure or detect, angular velocity and acceleration. Further, sensors 22*a*-22*c* can be regarded as posture information detection sensors, according to one or more embodiments of the present disclosure. The sensor 22*a*, the sensor 22*b*, and the sensor 22*c* can be mounted on or part of the stick 6, the boom 5, and the upper swiveling body 3, respectively. In this regard, the sensor 22*a*, the sensor 22*b*, and the sensor 22*c* can detect, or can be used to detect, information regarding the posture (including position) of the stick 6, the boom 5, and the upper swiveling body 3, respectively, using respective detection signals provided to the controller 25 via onboard network connection, such as via controller area network (CAN). The sensor 22*a*, the sensor 22*b*, and the sensor 22*c* can be regarded as a second IMU sensor, a third IMU sensor, and a first IMU sensor, respectively. According to one or more embodiments, respective sensors 22*a* to 22*c* can have individual identification numbers, and can be configured to be able to identify which detection signal input into the controller 25 comes from which sensors 22*a* to 22*c* by outputting detection information added with the individual identification numbers.

The pressure sensors 23*a*, 23*b*, and 23*d* can detect pressure at corresponding portions of the front linkage 4. Such pressure sensors 23*a*, 23*b*, and 23*d*, among other information, can indicate weight (force/torque) of corresponding portions of the front linkage 4. Signals from the pressure sensors 23*a*, 23*b*, and 23*d* can be received by the controller 25 and used to determine the weight (force/torque) of corresponding portions of the front linkage 4. According to one or more embodiments, such weight (force/torque) information can be based on known characteristics of the portions of the front linkage 4, i.e., the work tool 7, the stick 6, and the boom 5, which can be stored in computer-readable memory accessible by the controller 25.

Figure 2:
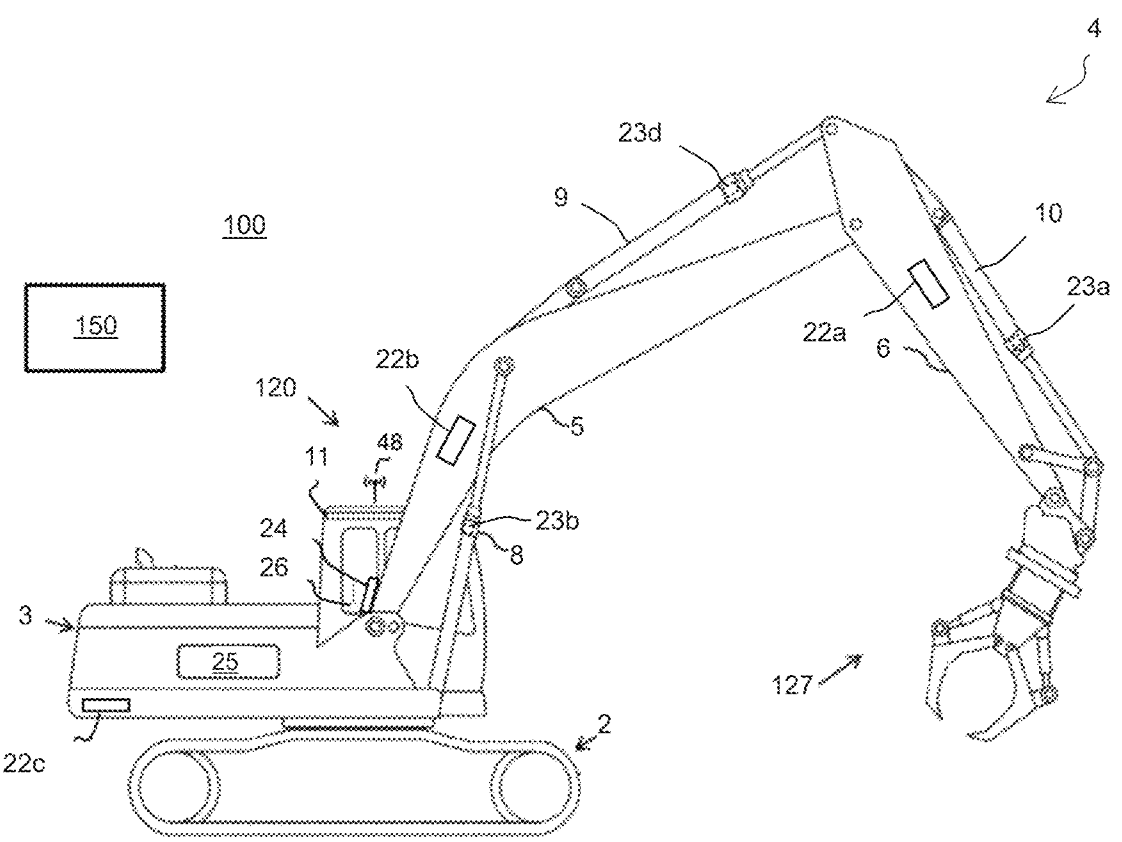
FIG. 2 shows another work machine according to one or more embodiments of the present disclosure, implemented in a system according to one or more embodiments of the disclosed subject matter.

Turning now to FIG. 2, this figure shows another work machine 120 according to one or more embodiments of the present disclosure. Here, the work machine 120 can be an excavator (e.g., a hydraulic excavator) and can include a clamshell or grapple as a work tool or implement 127. However, embodiments of the present disclosure are not limited to the front linkage 4 configuration shown in FIG. 2 and may include additional or alternative components, such as a foreboom, an offset boom, a quick coupler, a coupler, tilt rotor, etc. More generally, the front linkage 4, according to embodiments of the present disclosure, can include all components from the boom 5 to the work tool 127 (inclusive of both ends). For brevity, some portions of the work machine 120 corresponding to respective portions of the work machine 1 of FIG. 1 will not be described in detail again here with respect to FIG. 2. According to one or more embodiments, the work machine 120 may be implemented in a system 100, which may also include the back office system 150.

Like the work machine 1 of FIG. 1, the work machine 120 can interchange work tools, or even include multiple work tools at the same time, including a grapple (e.g., as shown), a bucket (e.g., as shown in FIG. 1), etc. In the case of the work tool 127 being the grapple or the clamshell, optionally, the work machine 1 may be without a position sensor to sense opening of the grapple/clamshell to dump or discharge its payload.

Also like the work machine 1, the work machine 120 can be mobile or non-mobile and may include, but is not limited to, machines (e.g., vehicles) that perform some type of operation associated with a particular industry, such as mining, construction, farming, transportation, forestry, etc. and operate between or within work environments, e.g., construction sites, mine sites, forests, power plants, on-highway applications, marine applications, demolition applications (e.g., grabbing and dumping or demolishing vehicles), etc. Incidentally, the payload for the work tool 127, according to one or more embodiments of the disclosed subject matter, can be timber, a vehicle to demolish, or an already demolished vehicle, as examples.

Optionally, the work machine 120 can have a communication system 48. The communication system 48 can communicate, for instance, wirelessly, with the back office system 150 and/or other machines or vehicles at a work site, such as one or more haul trucks at the work site. The communication system 48 can be implemented in or using circuitry. Among other information or data, load or payload data may be transmitted from the work machine 120, for instance, to the back office system 150, via the communication system 48. Optionally, the work machine 1 of FIG. 1 may include the communication system 48.

Figure 3:
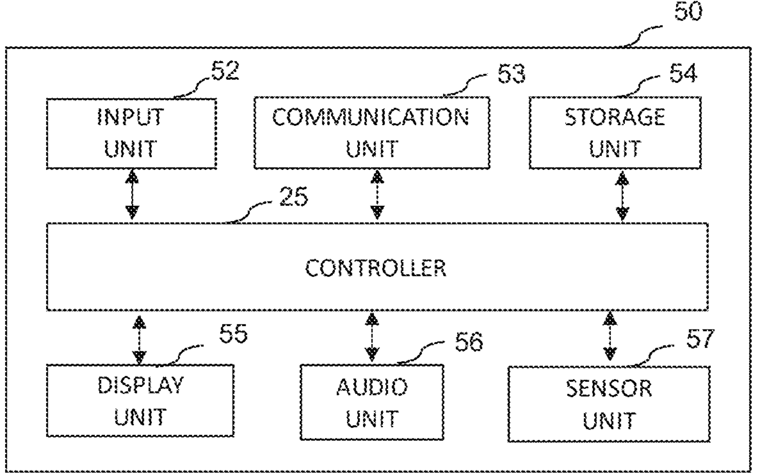
FIG. 3 is a block diagram of a control system according to one or more embodiments of the present disclosure.

Turning now to FIG. 3, FIG. 3 shows a block diagram illustrating a configuration of an information processing system 50 of the work machine 1 or the work machine 120 according to one or more embodiments of the disclosed subject matter. As illustrated in FIG. 3, the information processing system 50 can include an input unit 52, a communication unit 53, a storage unit 54, a display unit 55, an audio unit 56, a sensor unit 57, and the controller 25. Controller 25, as used herein, can include only one controller or multiple controllers.

In an exemplary implementation, information processing system 50 of the work machine 1 or the work machine 120, or portions thereof, can be implemented using circuitry or processing circuitry that can include general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors can be considered processing circuitry or circuitry as they include transistors and other circuitry therein. The processor may be a programmed processor which executes a program stored in a memory. In the disclosure, the circuitry, units, or means can be hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units can be a combination of hardware and software, the software being used to configure the hardware and/or processor.

The input unit 52 can have a function of receiving an input (or inputs) of operation information from a user of the information processing system 50, which can be the operator of the work machine 1 or the work machine 120. In this embodiment, for example, the input unit 52, which can be implemented in or using circuitry, can be implemented as or representative of the operator interface 24, the manual control 26, a touch panel of the display unit 55, and/or one or more foot pedals in the cab 11. In general, the input unit 52 can receive the input(s) and provide output to the controller 25 based on or using the input(s). An example of an input from the operator can be a command, for instance, input to the operator interface 24, to weigh some or all of the front linkage 4, such as the work tool 7 or the work tool 127. Other examples of inputs can be or include input comments to control movement of the work machine 1 or the work machine 120, or portion thereof, such as the front linkage 4, or portion thereof, such as the work tool 7 or the work tool 127.

The communication unit 53 can have a communication interface that has a function as a transmitter and a receiver performing communication with an external apparatus, for instance, based on the control from the controller 25. In this embodiment, the communication unit 53 can be configured using a communication device such as a local CAN, a wired or wireless LAN, a communication card for Bluetooth, a router for communication, and a modem for communication. According to one or more embodiments, the communication unit 53 can be implemented as or representative of communication system 48.

The storage unit 54 can have a function of storing a variety of information used by the controller 25. For example, the storage unit 54 can store wear data associated with wear of the front linkage 4, or portion(s) thereof, such as the work tool 7 or the work tool 127. Such wear data can include an initial weight of each of a plurality of work tools, including the work tool 7 and/or the work tool 127, a wear rate of the plurality of work tools, a wear profile of the plurality of work tools, and/or wear thresholds for the plurality of work tools. Optionally, the foregoing can apply to some or all of the portions of the front linkage 4. According to one or more embodiments, the operator of the work machine 1 or the work machine 120 can input, for instance, via the input unit 52, wear data (e.g., the initial weight) or otherwise associate (e.g., select from a drop-down menu) the wear data regarding the front linkage or portion thereof (e.g., the work tool 7 or the work tool 127). As an example, when the work tool 7 or the work tool 127 is first installed on the front linkage 4 the operator may input wear data associated with the added work tool. The storage unit 54 can be configured using a storage device such as a magnetic storage device, a semiconductor storage device, and an optical storage device. As noted above, the weight(s) of the installed work tool(s) 7, 127 and/or candidate work tool(s) for installation can be downloaded, for instance, from the back office system 150, to the work machine 1, 120 to create an initial wear baseline. Such data may be stored in the storage unit 54 and accessed by the controller 25. Optionally, the weight(s) of other portions of the front linkage, such as a tiltrotor and/or a coupler (e.g., quick coupler), can be downloaded to the work machine to create an initial weight or wear baseline. This data may also be stored in the storage unit 54 and accessed by the controller 25.

The display unit 55 can have a function of displaying a variety of information based on control from the controller 25. For example, the display unit 55 can display some or all of the input information acquired by the input unit 52. Such information may include information regarding wear of the wear of the front linkage 4, or portion(s) thereof, such as the work tool 7 or the work tool 127. As an example, the information can indicate that wear of the portion(s) of the front linkage 4 have exceeded a wear threshold or are about to exceed a wear threshold (including an estimated amount of time when the portion(s) of the front linkage 4 is expected to exceed the wear threshold. Wear threshold(s), according to one or more embodiments of the present disclosure, can be a predetermined weight range for the portion(s) of the front linkage 4. Additionally or alternatively, the information can indicate to the operator that current wear information does not correspond to a newly coupled work tool and/or that the operator needs to change parameters to correspond to the newly coupled work tool. In this case, the operator can set, using the input unit 52, the current wear information and/or the parameters to correspond to the newly coupled work tool. The display unit 55 can be configured using a display device such as a liquid crystal display, a plasma display, and an organic EL display. The display unit 55 can be implemented as a monitor or display, for instance, as part of the operator interface 24, and can be equipped with a touch panel to input information to the controller 25. Optionally, offboard systems may alert another party other than the operator of the work machine 1, 120, such as an operator at the back office system 150, a dealer or owner of the work machine 1, 120 or the work tool 7, 127, and/or site service personnel that service is required or soon may be required. Additionally or alternatively, carryback type information can be output from the work machine 1, 120 to a foreman, for instance, for training or considering changing process to better ensure complete emptying of the work tool 7, 127 has occurred.

The audio unit 56 can have a function of outputting sound based on control from the controller 25. In this embodiment, the audio unit 56 can be implemented as a horn or a speaker of the work machine 1 or the work machine 120. In this embodiment, optionally, the audio unit 56 can output sound that may include or be part of instruction to the operator of the work machine 1 or the work machine 120, for instance, regarding wear information pertaining to the portion(s) of the front linkage 4.

The sensor unit 57 can detect various data or information of the work machine 1 or the work machine 120. According to one or more embodiments of the present disclosure, the sensor unit 57 can be implemented as or representative of some of all of the sensors 22*a*-22*c*, some or all of the pressure sensors 23*a*, 23*b*, 23*d*, and/or one or more other sensors of the work machine 1 or the work machine 120 (e.g., a triaxial acceleration sensor (including an acceleration sensor, a gravity detection sensor, and a fall detection sensor) or a triaxial gyro sensor (including an angular velocity sensor, and a geomagnetic sensor)). Thus, the sensor unit 57 can sense data or information associated with some or all of the foregoing sensors. Such sensed data or information can be sent to and processed by the controller 25.

The controller 25 can have a function of controlling some or all of the information processing system 50. For example, the controller 25 can control the operation of the work machine 1 or the work machine 120 based on information from the input unit 52, information from the storage unit 54, and/or information from the sensor unit 57.

Figure 4:
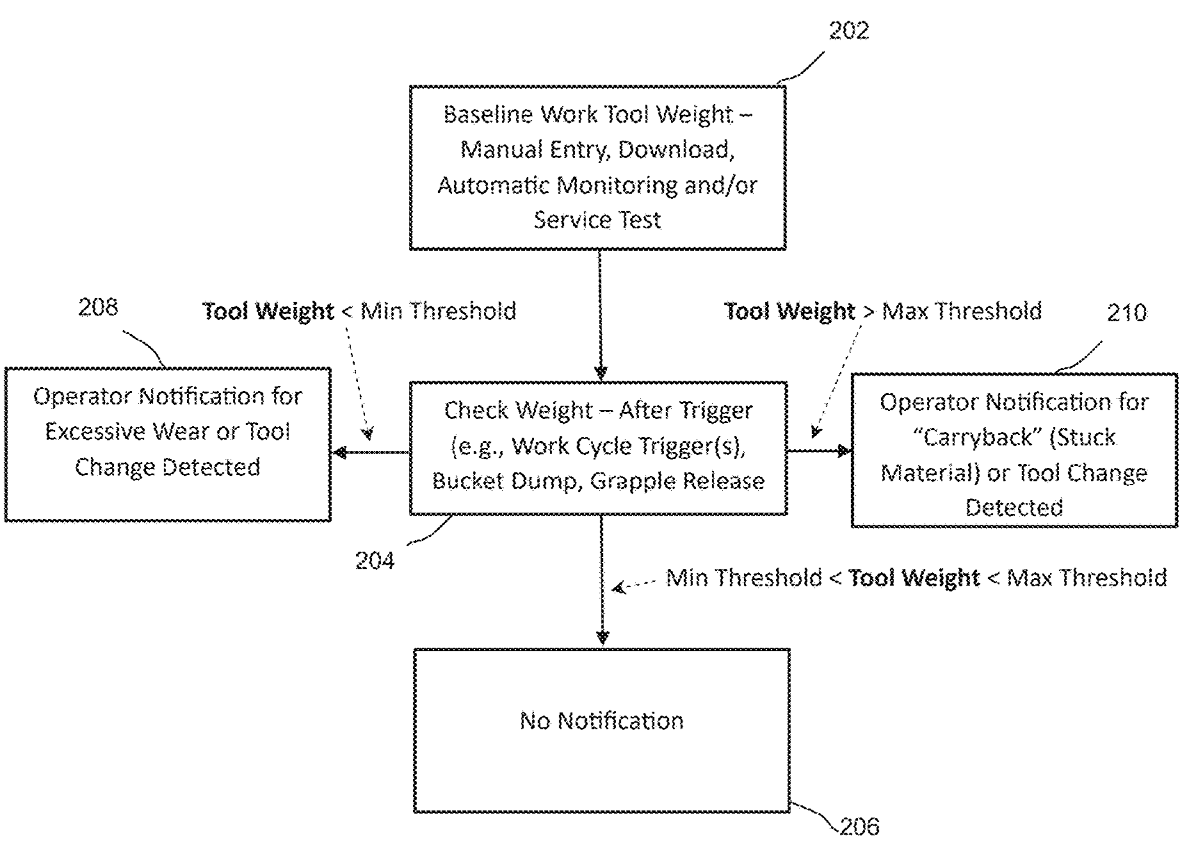
FIG. 4 is a function block diagram showing various exemplary operations according to one or more embodiments of the disclosed subject matter.

Generally speaking, the controller 25 can determine weight of the front linkage 4, or portion(s) thereof, such as the work tool 7 or the work tool 127, based on data from sensors, such as the sensors 22*a*-22*c* and pressure sensors 23*a*, 23*b*, 23*d*, and whether the weight has decreased or increased relative to a previous determined weight. The decrease or increase can correspond to unsuitable wear of the portion(s) of the front linkage 4, damage to the portion(s) of the front linkage 4, a change in configuration to the front linkage 4 (e.g., a replacement of the work tool 7 or the work tool 127), or payload remaining in or on the work tool 7 or the work tool 127. That is, the work machine 1, 120 can be used as a scale to determine weight of the portion(s) of the front linkage 4, and such weight can be determined at appropriate times. Thus, according to one or more embodiments, the controller 25 may not continuously determine weight of the portion(s) of the front linkage 4, at least as such weight determination pertains to determining wear of the portion(s) of the front linkage 4. Rather, the controller 25 may determine weight of the portion(s) of the front linkage 4 to determine wear of the portion(s) of the front linkage 4 only at appropriate times, though during such appropriate times the determining weight may be performed continuously, periodically, or on a one-time basis. FIG. 4 is a functional block diagram of the various operations pertaining to determining weight of the portion(s) of the front linkage 4, according to one or more embodiments of the disclosed subject matter.

Determining weight of the portion(s) of the front linkage 4 at appropriate times can involve the controller 25 first determining that the work machine 1, 120 is in a predetermined state to determine weight of the portion(s) of the front linkage 4. The work machine 1, 120, or portion thereof, such as some or all of the front linkage 4, can be stationary or moving in the predetermined state to determine the weight of the portion(s) of the front linkage 4. FIG. 4 indicates the controller 25 can determine that the work machine 1, 120 is in the predetermined state at operation or function 204.

As an example, the predetermined state to determine weight of the work tool 7, 127 can be a state in which the work tool 7, 127 is free of payload, is expected to be free of payload, or is below a predetermined residual payload or carryback threshold. Put another way, the payload can be zero, can be expected to be zero, or can be below the predetermined residual payload or carryback threshold.

The payload can be zero, expected to be zero, or below the predetermined residual payload or carryback threshold, for instance, after changing or replacing the work tool 7, 127, or generally at the end of a particular work cycle or work cycle trigger, such as after a dump or release operation of the work tool 7, 127, or before the start of another work cycle, such as before a dig, load, or grab operation of the work tool 7, 127. Optionally, a predetermined time may elapse in the predetermined state before the controller 25 determines the weight of the portion(s) of the front linkage 4, for instance, to allow the work tool 7, 127 to settle or stabilize after the end of the work cycle, upon being coupled to the front linkage 4, or before the start of another work cycle.

The controller 25 can determine that the work machine 1, 120 is in the predetermined state to determine the weight of the portion(s) of the front linkage 4 automatically, for instance, upon detection of the end of a particular cycle or work cycle trigger using position data corresponding to positioning of the front linkage 4, or portion(s) thereof. Such position data can be provided by one or more sensors of the work machine 1, 120, such as one or more of the sensors 22*a*-22*c* and/or one or more of the pressure sensors 23*a*, 23*b*, 23*d*. Optionally, detection of the end of the particular cycle or work cycle trigger can use position data corresponding to positioning (e.g., orientation, swing angle, etc.) of the overall work machine 1, 120. Such position data can be provided by one or more sensors of the work machine 1, 120, such as an inertial navigation unit (INU) or a global positioning system (GPS) unit onboard the work machine 1, 120.

Additionally or alternatively, the controller 25 can determine that the work machine 1, 120 is in the predetermined state to determine the weight of the portion(s) of the front linkage 4 in response to a manual operation, for instance, inputted to the manual control device 26 or the input unit 52 by the operator of the work machine 1, 120, such as a dump or grapple release command by the operator or a check weight or check wear command inputted to by the operator. The latter may be implemented in the case where the work tool of the work machine does not have a clear work cycle, such as in the case of a roller of a compactor, or according to an inspection schedule, though embodiments of the present disclosure are not so limited.

With the work machine 1, 120 in the predetermined state to determine the weight of the portion(s) of the front linkage 4, the controller 25 can check or determine the weight of the portion(s) of the front linkage 4. Such determining can use feedback from one or more sensors, such as one or more of the sensors 22*a*-22*c* and/or one or more of the pressure sensors 23*a*, 23*b*, 23*d*. In general, the weight calculation of the portion(s) of the work implement 7, 127 can be performed based on or using center of a center gravity of the work machine 1, 120, the structure of the front linkage 4, positioning of the front linkage 4, positioning of the work machine 1, 120 (e.g., the upper swiveling body 3) relative to gravity, etc., and using kinematic math and the forces associated with the pressure sensors 23*a*, 23*b*, 23*d*, the controller 25 can calculate the mass of the various portions of the work machine 1, 120 and then remove the known masses, leaving the corresponding weight(s) of the portion(s) of the front linkage 4.

The controller 25 can determine the weight of the portion(s) of the front linkage 4 automatically, for instance, upon detection of the end of a particular cycle or work cycle trigger using position data corresponding to positioning of the front linage 4, or portion(s) thereof or in response to input (e.g., a command) by the operator (and with the work machine 1, 120 in the predetermined state to determine the weight of the portion(s) of the front linkage 4). Such weight determination with the work machine 1, 120 is in the predetermined state can be performed continuously, periodically, or on a one-time basis.

The controller 25 can determine whether the weight (again, or weights) of the portion(s) of the front linkage 4 is outside of a predetermined weight range. The predetermined weight range may be based on or include one or more predetermined weight thresholds (e.g., minimum or maximum) and/or one or more weight wear-over-time profiles associated with the portion or portions of the front linkage 4. Optionally, the determination can be based on or using one or more prior weight determinations, that is, a change in weight from a prior weight of the portion(s) of the front linkage 4, such as a prior weight determination and/or an initial weight of the portion(s) of the front linkage 4 when initially coupled to the front linkage 4.

The predetermined weight range(s) can be stored in the storage unit 54 of the information processing system 50 and accessed by the controller 25, for instance, to determine whether the weight of the portion(s) of the front linkage 4 is outside of a predetermined weight range. Optionally, the storage unit 54 may store predetermined weight range(s) for each portion of the front linkage 4 and/or predetermined weight range(s) for a plurality of different work tools connectable to the front linkage 4. The operator of the work machine 1, 120 can set the particular work tool, for instance, the work tool 7 or the work tool 127, upon the work tool being coupled to the front linkage 4; the operator may also set parameters for the work tool coupled to the front linkage 4. Thus, the controller 25 can know which predetermined weight range(s) to access when comparing the current weight of the work tool. In this regard, a baseline or initial weight and/or weight wear profile of the coupled work tool can be provided to the information processing system 50, for instance, to the storage unit 54, by manual entry from the operator, by download via the communication system 48 or the communication unit 53, automatically via work cycle monitoring, and/or via a service test. FIG. 4 indicates that various pieces of information or data can be input at operation or function 202 and accessed by the controller 25 to determine whether the weight of the portion(s) of the front linkage 4 is outside of the predetermined weight range.

According to one or more embodiments of the present disclosure, the controller 25 can determine that the weight of the portion(s) of the front linkage 4, such as the weight of the work tool 7, 127, has decreased or increased, and that such decrease or increase corresponds to unsuitable wear of the portion(s) of the front linkage 4, damage to the portion(s) of the front linkage 4, a change in configuration to the front linkage 4 (e.g., a replacement of the work tool 7 or the work tool 127), or payload remaining in or on the work tool 7 or the work tool 127. FIG. 4 indicates operations that may be performed according to one or more embodiments of the present disclosure, depending upon whether the determined weight of the portion(s) of the front linkage 4 is within or outside of the predetermined weight range. In the case of the determined weight being within the predetermined weight range, no notification may be output, according to operation or function 206 in FIG. 4.

Here, an increase in the weight can correspond to a change in configuration of the front linkage 4, where a heavier component thereof has been added, or payload remaining in or on the work tool 7 or the work tool 127. FIG. 4 operation or function 210 can be representative of either of these scenarios. Remaining payload may be regarded as carryback. A decrease can correspond to unsuitable wear, i.e., wear requiring replacement or repair of the corresponding component or a need to schedule replacement or repair, or damage to the portion(s) of the front linkage 4, which can also lead to replacement or repair of the corresponding component or the scheduling of repair or replacement. FIG. 4 operation or function 208 can be representative of either of these scenarios. In general, according to one or more embodiments, the portion of the front linkage 4 that would wear would be the portion interacting with the working material.

In the case of decrease, the decrease in weight can be from within predetermined weight range to outside the predetermined weight range. According to one or more embodiments, the decrease can be by a predetermined amount, where the predetermined amount can correspond to damage to the portion(s) of the front linkage 4 or wear over time of the portion(s) of the front linkage 4, particularly where the former corresponding to damage can be greater in amount than that latter corresponding to wear over time. Further, the predetermined amount corresponding to wear over time can itself be below a predetermined weight change threshold, where the predetermined weight change threshold may correspond to the predetermined amount corresponding to damage. That is, the controller 25 can distinguish whether the portion(s) of the front linkage 4 experiences wear over time or damage based on whether the change in weight is below the predetermined weight change threshold (wear over time) or over the predetermined weight change threshold (damage).

In the case of a change in work tool, such as the work tool 7 or the work tool 127, the weight may, relative to the immediately previous work tool, increase or decrease. FIG. 4 operation/function 210 or operation/function 208 can be representative of either of these scenarios. The increase can correspond to the same type of work tool being replaced, for instance, because that work tool has become worn or damaged, such as discussed above. Here, the weight of the newly coupled work tool should correspond to the work tool in its non-worn or non-damaged state, for instance, at or within a predetermined amount from a so-called new or initial weight of the newly coupled work tool. The new or initial weight can be the weight of a brand-new work tool or a rehabbed work tool. Such new or initial weight of the newly coupled work tool can be stored in the storage unit 54 prior to coupling to the front linkage 4 and accessed by the controller 25 for comparison with the weight of the newly coupled work tool to determine whether the newly coupled work tool corresponds to the new or initial weight. The newly coupled work tool can be determined to correspond to the new or initial weight if its weight is at or within a predetermined amount from the new or initial weight.

Alternatively, the increase in weight of the newly coupled work tool can correspond to a different type of work tool, for instance, changing from the work tool 7 to the work tool 127 or vice versa. The different type of work tool may alternatively correspond to a decrease in weight of the newly coupled work tool compared to the previous work tool. FIG. 4 operation/function 210 or operation/function 208 can be representative of either of these scenarios. Here, the storage unit 54 can store different weights (including different weight ranges) for different types of work tools. Upon the newly coupled work tool being coupled to the front linkage 4, the weight of the newly coupled work tool can be determined and compared against stored weights. Such comparison can be performed to detect a tool change and even identify the type of work tool coupled to the front linkage 4.

Under a condition where the determined weight of the portion(s) of the front linkage 4 falls outside of the predetermined weight range, the controller 25 can cause one or more notifications to be output locally at the work machine 1, 120 and/or remote from the work machine 1, 120, for instance, at the back office system 150. The notification(s), which may be output by the display unit 55 and/or the audio unit 56, can be or include information, an alert, and/or a further action to be taken. Example notifications can be based on whether the weight of the portion(s) of the front linkage 4 is/are above or below the predetermined weight range and can include an alert to replace the portion(s) of the front linkage 4, part replacement information (e.g., type, availability, etc.), estimated work tool life, instructions to update one or more work tool parameters corresponding to a newly coupled work tool, payload remaining (i.e., carryback), instructions for removing the carryback, instructions to perform another payload discharge operation, scheduling replacement of the portion(s) of the front linkage 4, inspecting the portion(s) of the front linkage 4.

INDUSTRIAL APPLICABILITY

As noted above, embodiments of the present disclosure relate to systems, methods, and computer program products for determining work implement wear, damage, and/or change. Additionally or alternatively, embodiments of the present can related to systems, methods, and computer program products for determining when payload remains in a work tool after a payload dump or disposal operation.

Also noted above, work tools on a work machine (e.g., an excavator) can wear, can be damaged, and can be changed throughout the life of the work machine to which they are connected. It may be challenging for an operator of the work machine to determine excessive wear or damage, and the operator may forget to change the work tool selected in the control system/display when the work took is physically changed. This may result in unexpected down time or inappropriate parameters being used on the work machine.

According to one or more embodiments of the present disclosure, utilizing sensors of a work machine that determine front linkage position and payload (e.g., position sensors, IMUs, pressure sensors, etc.), it can be possible to weigh the work tool at one or more appropriate times. This weight can help determine wear, damage, and tool changes. With this information, it can be possible to alert the operator and/or technician appropriately so that either service/replacement can be planned, or the machine settings can be adjusted in the case of a tool change when the operator has forgotten to change the settings. Additionally or alternatively, the determined weight may be used to alert the operator in the case that excessive material is stuck on the work tool, i.e., carryback, which may encourage cleaning and/or work process changes.

According to one or more embodiments, the weight(s) of the installed work tool(s) and/or candidate work tool(s) for installation can be downloaded, for instance, from a back office system, to the work machine to create an initial wear baseline. Such data may be stored in a storage unit of the work machine and accessed by a controller of the work machine. Optionally, the weight(s) of other portions of the front linkage, such as a tiltrotor and/or a coupler (e.g., quick coupler), can be downloaded to the work machine to create an initial weight or wear baseline. This data may also be stored in the storage unit and accessed by the controller of the work machine.

The determined weight of the front linkage can tell the operator and/or a technician or service personnel that there is a weight-related issue for the front linkage that may need inspecting. According to one or more embodiments, the front linkage may be weighed at different times upon sequential decoupling of components attached to the front linkage. For instance, the weight of the front linkage may be determined with the work tool, then determined again with the work tool decoupled, and then determined again with the next component removed (e.g., a tiltrotor or a coupler). Optionally, an alert or notice may be output to the operator of the work machine to perform the sequential separation process.

Figure 5:
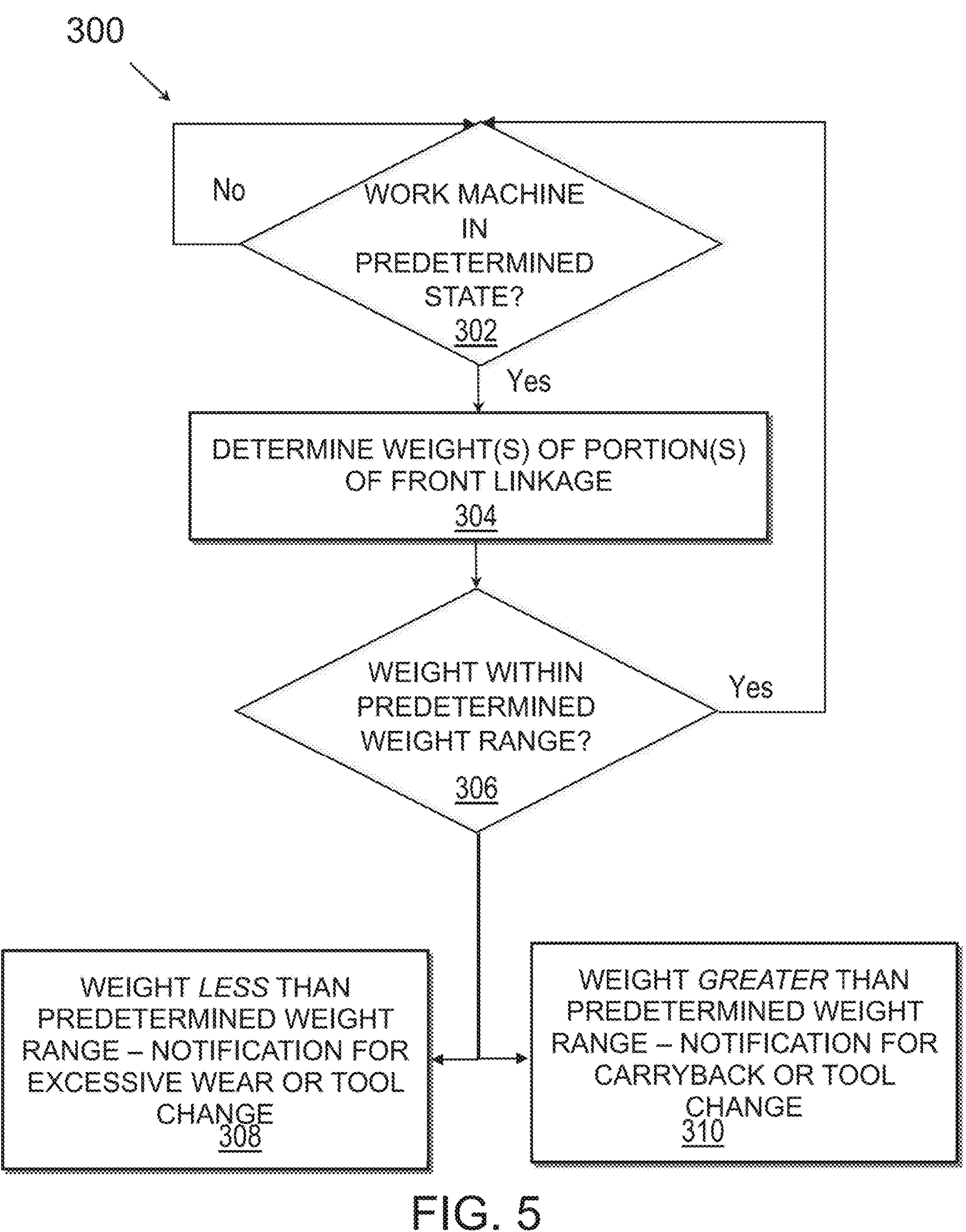
FIG. 5 is a flow chart of a method according to one or more embodiments of the present disclosure.

FIG. 5 is a flow chart of a method 300 according to embodiments of the disclosed subject matter. Some or all of the method 300 can be performed via a non-transitory computer-readable storage medium (or media) having stored thereon instructions that, when executed by one or more processors, such as one or more processors of the controller 25, causes the one or more processors to perform some or all of the method 300. According to one or more embodiments, the method 300 may be referred to or characterized as a method for determining one or more of unsuitable wear of one or more portion(s) of the front linkage 4, damage to the portion(s) of the front linkage 4, a change in configuration to the front linkage 4 (e.g., a replacement of the work tool 7 or the work tool 127), or payload remaining in or on the work tool, such as the work tool 7 or the work tool 127.

At 302, the method 300 can involve determining whether the work machine, such as the work machine 1 or the work machine 120, is in a predetermined state to weigh at least a portion of the front linkage 4, such as the work tool 7 or the work tool 127. The controller 25 can determine whether the work machine is in the predetermined state to determine the weight of the portion(s) of the front linkage 4.

According to one or more embodiments, the controller 25 can determine that the work machine 1, 120 is in the predetermined state to determine the weight of the portion(s) of the front linkage 4 automatically, for instance, upon detection of the end of a particular cycle or work cycle trigger using position data corresponding to positioning of the front linage 4, or portion(s) thereof. Such position data can be provided by one or more sensors of the work machine 1, 120, such as one or more of the sensors **22*a*-22*c* and/or one or more of the pressure sensors 23*a*, 23*b*, 23*d*. Optionally, detection of the end of the particular cycle or work cycle trigger can use position data corresponding to positioning (e.g., orientation, swingle angle, etc.) of the overall work machine 1, 120. Such position data can be provided by one or more sensors of the work machine 1, 120, such as an inertial navigation unit (INU) or a global positioning system (GPS) unit onboard the work machine 1, 120**.

Additionally or alternatively, the controller 25 can determine that the work machine 1, 120 is in the predetermined state to determine the weight of the portion(s) of the front linkage 4 in response to a manual operation, for instance, inputted to the manual control device 26 or the input unit 52 by the operator of the work machine 1, 120, such as a dump or grapple release command by the operator or a check weight or check wear command inputted to by the operator. The latter may be implemented in the case where the work tool of the work machine does not have a clear work cycle, such as in the case of a roller of a compactor, or according to an inspection schedule, though embodiments of the present disclosure are not so limited.

The method 300, at operation or step 304, and with the work machine 1, 120 in the predetermined state to determine the weight of the portion(s) of the front linkage 4, can determine weight of one or more portions of the front linkage 4.

Such determining the weight can use feedback from one or more sensors, such as one or more of the sensors 22$a$-22$c$ and/or one or more of the pressure sensors 23$a$, 23$b$, 23$d$. The controller 25 can determine the weight of the portion(s) of the front linkage 4 automatically, for instance, upon detection of the end of a particular cycle or work cycle trigger using position data corresponding to positioning of the front linage 4, or portion(s) thereof or in response to input (e.g., a command) by the operator (and with the work machine 1, 120 in the predetermined state to determine the weight of the portion(s) of the front linkage 4).

At 306, the method 300 involves determining whether the determined weight is within a predetermined weight range. Put another way, operation 306 can involve determining that the determined weight is outside of the predetermined weight range. For instance, the controller 25 can determine that the weight of the portion(s) of the front linkage 4, such as the weight of the work tool 7, 127, has decreased or increased, and that such decrease or increase corresponds to unsuitable wear of the portion(s) of the front linkage 4, damage to the portion(s) of the front linkage 4, a change in configuration to the front linkage 4 (e.g., a replacement of the work tool 7 or the work tool 127), or payload remaining in or on the work tool 7 or the work tool 127.

Operation 308 of the method 300 involves a case where the determined weight of the portion(s) of the front linkage 4 is less than the predetermined weight range (e.g., minimum threshold). Here, a notification of can be output and indicative of either excessive wear of the portion(s) of the front linkage 4 or a tool change.

Operation 310 of the method 300 involves a case where the determined weight of the portion(s) of the front linkage 4 is greater than the predetermined weight range (e.g., minimum maximum threshold). Here, a notification of can be output and indicative of either carryback or a change of the work tool.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosed subject matter can also be as set forth according to the following parentheticals.

(1) An excavator comprising: a lower traveling body; an upper swiveling body operatively coupled to the lower traveling body and configured to swivel relative to the lower traveling body; a front linkage having a first end operatively coupled to the upper swiveling body, the front linkage including a boom, a stick, and a work tool at a second end opposite the first end; a plurality of inertial measurement unit (IMU) sensors, including a first IMU sensor operatively coupled to the upper swiveling body, a second IMU sensor operatively coupled to the boom, and a third IMU sensor operatively coupled to the stick; and circuitry configured to determine that the excavator is in a predetermined state to determine weight of the work tool, the predetermined state being based on a position of the front linkage determined from feedback from the second IMU sensor and the third IMU sensor, and a position of the upper swiveling body determined from feedback from the first IMU sensor, determine the weight of the work tool under a condition where the excavator is in the state to determine the weight of the work tool, determine that the determined weight of the work tool is outside of a predetermined weight range, and electronically output information at the excavator and/or remote from the excavator indicating that a further action is to be taken regarding the work tool based on the weight of the work tool being outside of the predetermined weight range.

(2) The excavator according to (1), wherein the circuitry determining that the determined weight of the work tool is outside of the predetermined weight range involves the determined weight of the work tool decreasing, from within the predetermined weight range, by a predetermined amount indicative of damage to the work tool.

(3) The excavator according to (1) or (2), wherein the circuitry determining that the determined weight of the work tool is outside of the predetermined weight range involves the determined weight of the work tool decreasing, from within the predetermined weight range, by an amount less than a predetermined threshold.

(4) The excavator according to any one of (1) to (3), wherein the circuitry determining that the determined weight of the work tool is outside of the predetermined weight range involves the determined weight of the work tool changing to correspond to a weight associated with a different work tool.

(5) The excavator according to any one of (1) to (4), wherein the circuitry electronically outputs the information at the excavator in the form of an alert to an operator of the excavator instructing the operator to update one or more work tool parameters corresponding to the different work tool as the further action to be taken.

(6) The excavator according to any one of (1) to (5), wherein the predetermined state to determine the weight of the work tool is a state in which the work tool should be free of payload, and wherein the circuitry determining that the determined weight of the work tool is outside of the predetermined weight range involves the determined weight of the work tool increasing from within the predetermined weight range.

(7) The excavator according to any one of (1) to (6), wherein the circuitry electronically outputs the information at the excavator in the form of an alert to an operator of the excavator instructing the operator to control the excavator to perform another payload discharge operation.

(8) The excavator according to any one of (1) to (7), wherein the circuitry electronically outputs the information remote from the excavator indicating that the further action to be taken regarding the work tool is scheduling replacement of the work tool or portion thereof.

(9) The excavator according to any one of (1) to (8), wherein the circuitry automatically determines the weight of the work tool under the condition where the excavator is in the state to determine the weight of the work tool and without input from an operator of the excavator.

(10) The excavator according to any one of (1) to (9), wherein the circuitry determines the weight of the work tool under the condition where the excavator is in the state to determine the weight of the work tool in a case where the excavator is stationary.

(11) A method regarding an excavator comprising: determining, based on signals from at least one sensor of the excavator, that the excavator is in a predetermined state to weigh at least a portion of a front linkage of the excavator; determining a weight of the portion of the front linkage of the excavator under a condition that the excavator is in the state to weigh the portion of the front linkage of the excavator; determining that the determined weight of the portion of the front linkage is outside of a predetermined weight range; and electronically outputting information regarding a further action to be taken with respect to the portion of the front linkage of the excavator, wherein the predetermined state is a state in which a work tool of the front linkage of the excavator is expected to be without any payload.

(12) The method according to (11), wherein the portion of the front linkage is the work tool.

(13) The method according to (11) or (12), wherein the further action includes one of inspecting the portion of the front linkage, replacing some or all of the portion of the front linkage, scheduling replacement of some or all of the portion of the front linkage, updating one or more parameters corresponding to a different portion of the front linkage replacing the portion of the front linkage associated with the determined weight, or performing another payload discharge operation.

(14) The method according to any one of (11) to (13), wherein said determining that the determined weight of the portion of the front linkage is outside of the predetermined weight range involves the determined weight decreasing, from within the predetermined weight range, by at least a predetermined amount.

(15) The method according to any one of (11) to (14), wherein said determining that the determined weight of the portion of the front linkage is outside of the predetermined weight range involves the determined weight being below a predetermined weight profile corresponding to that portion of the front linkage.

(16) The method according to any one of (11) to (15), wherein said determining that the determined weight of the portion of the front linkage is outside of the predetermined weight range involves the determined weight changing to correspond to a weight associated with a different portion of the front linkage.

(17) The method according to any one of (11) to (16), wherein said determining that the determined weight of the portion of the front linkage is outside of the predetermined weight range involves the determined weight increasing from within the predetermined weight range, and wherein the method further comprises electronically outputting the information regarding the further action to be taken with respect to the portion of the front linkage of the excavator in the form of an alert to an operator of the excavator instructing the operator to control the excavator to perform another payload discharge operation.

(18) A non-transitory computer-readable storage medium having stored thereon instructions that, when executed by one or more processors, causes the one or more processors to perform a method comprising: determining, based on signals from at least one sensor of a work machine, that the work machine is in a predetermined state to weigh a work tool of the work machine; determining, automatically and without input by an operator of the work machine, the weight of the work tool under a condition where the work machine is in the state to weigh the work tool; determining that the determined weight of the work tool is outside of a predetermined weight range; and electronically outputting information regarding a further action to be taken with respect to the work tool, wherein the further action includes one of inspecting the work tool, replacing some or all of the work tool, scheduling replacement of some or all of the work tool, updating one or more parameters corresponding to a different work tool that replaced the work tool associated with the determined weight, or performing a payload discharge operation.

(19) The non-transitory computer-readable storage medium according to (18), wherein said determining, automatically and without input by the operator of the work machine, the weight of the work tool under the condition where the work machine is in the state to weigh the work tool is performed with a portion of the work machine moving.

(20). The non-transitory computer-readable storage medium according to (18) or (19), wherein said determining that the determined weight of the work tool is outside of the predetermined weight range involves the weight of the work tool decreasing, and wherein the work tool is either a bucket or a grapple.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An excavator comprising:

a lower traveling body;

an upper swiveling body operatively coupled to the lower traveling body and configured to swivel relative to the lower traveling body;

a front linkage having a first end operatively coupled to the upper swiveling body, the front linkage including a boom, a stick, and a work tool at a second end opposite the first end;

a plurality of inertial measurement unit (IMU) sensors, including a first IMU sensor operatively coupled to the upper swiveling body, a second IMU sensor operatively coupled to the boom, and a third IMU sensor operatively coupled to the stick; and circuitry configured to determine that the excavator is in a predetermined state to determine weight of the work tool, the predetermined state being based on a position of the front linkage determined from feedback from the second IMU sensor and the third IMU sensor, and from a position of the upper swiveling body determined from feedback from the first IMU sensor, and the predetermined state indicating a determined end of a work tool unloading operation and that a predetermined time period has expired after the determined end of the work tool unloading operation, determine the weight of the work tool under a condition where the excavator is in the predetermined state to determine the weight of the work tool, determine that the determined weight of the work tool is outside of a predetermined weight range, and electronically output information at the excavator and/or remote from the excavator indicating that a further action is to be taken regarding the work tool based on the weight of the work tool being outside of the predetermined weight range, wherein the circuitry determining that the determined weight of the work tool is outside of the predetermined weight range involves the determined weight of the work tool decreasing from within the predetermined weight range to outside the predetermined weight range, wherein the circuitry determines whether the decrease in the determined weight of the work tool corresponds to damage to the work tool or wear over time of the work tool, the decrease in the determined weight of the work tool being above a predetermined weight change threshold for damage and below the predetermined weight change threshold for wear over time, wherein the predetermined state to determine the weight of the work tool is a state in which the work tool should be free of payload, and wherein the electronically output information includes part replacement information to replace the work tool under the condition where the work tool is identified to be damaged or worn over time.

2. The excavator according to claim 1, wherein the circuitry determining that the determined weight of the work tool is outside of the predetermined weight range involves a comparison of the determined weight of the work tool relative to wear data specific to the work tool and including a wear profile corresponding to the work tool.

3. The excavator according to claim 1, wherein the circuitry determining that the determined weight of the work tool is outside of the predetermined weight range involves the determined weight of the work tool changing to correspond to a weight associated with a different work tool.

4. The excavator according to claim 3, wherein the circuitry electronically outputs the information at the excavator in the form of an alert to an operator of the excavator instructing the operator to update one or more work tool parameters corresponding to the different work tool as the further action to be taken.

5. The excavator according to claim 1, wherein the circuitry determining that the determined weight of the work tool is outside of the predetermined weight range involves the determined weight of the work tool increasing from within the predetermined weight range to outside the predetermined weight range.

6. The excavator according to claim 5, wherein the circuitry electronically outputs the information at the excavator in the form of an alert to an operator of the excavator instructing the operator to control the excavator to perform another payload discharge operation.

7. The excavator according to claim 1, wherein the circuitry electronically outputs the information remote from the excavator indicating that the further action to be taken regarding the work tool is scheduling replacement of the work tool or portion thereof.

8. The excavator according to claim 1, wherein the circuitry automatically determines the weight of the work tool under the condition where responsive to the excavator reaching the state to determine the weight of the work tool and without input from an operator of the excavator requesting determination of the weight of the work tool.

9. The excavator according to claim 1, wherein the circuitry determines the weight of the work tool under the condition where the excavator is in the state to determine the weight of the work tool in a case where the excavator is stationary.

10. A method regarding an excavator comprising:

determining, based on signals from at least one sensor of the excavator, that the excavator is in a predetermined state to weigh at least a portion of a front linkage of the excavator, the predetermined state to weigh the portion of the front linkage of the excavator indicating a determined end of a work tool unloading operation for the excavator;

determining a weight of the portion of the front linkage of the excavator responsive to reaching the predetermined state to weigh the portion of the front linkage of the excavator;

determining that the determined weight of the portion of the front linkage is outside of a predetermined weight range; and electronically outputting information regarding a further action to be taken with respect to the portion of the front linkage of the excavator; and electronically scheduling the portion of the front linkage to be replaced, wherein the predetermined state is a state in which the work tool of or on the front linkage of the excavator is expected to be without any payload, wherein said determining that the determined weight of the portion of the front linkage is outside of the predetermined weight range involves the determined weight decreasing from within the predetermined weight range to outside the predetermined weight range, wherein the decrease in the determined weight of the portion of the front linkage corresponds to damage to the front linkage or wear over time of the front linkage, the decrease in the determined weight of the front linkage being above a predetermined weight change threshold for damage and below the predetermined weight change threshold for wear over time, and wherein the electronically output information identifies which portion of the front linkage to replace under the condition where the front linkage is identified to be damaged or worn over time.

11. The method according to claim 10, wherein the portion of the front linkage is the work tool.

12. The method according to claim 10, wherein the further action includes one of inspecting the portion of the front linkage, replacing some or all of the portion of the front linkage, scheduling replacement of some or all of the portion of the front linkage, updating one or more parameters corresponding to a different portion of the front linkage replacing the portion of the front linkage associated with the determined weight, or performing another payload discharge operation.

13. The method according to claim 10, wherein said determining that the determined weight of the portion of the front linkage is outside of the predetermined weight range involves the determined weight being below a predetermined weight profile corresponding to that portion of the front linkage.

14. The method according to claim 10, wherein said determining that the determined weight of the portion of the front linkage is outside of the predetermined weight range involves the determined weight changing to correspond to a weight associated with a different portion of the front linkage.

15. The method according to claim 10, wherein said determining that the determined weight of the portion of the front linkage is outside of the predetermined weight range involves the determined weight increasing from within the predetermined weight range to outside the predetermined weight range, and wherein the method further comprises electronically outputting the information regarding the further action to be taken with respect to the portion of the front linkage of the excavator in the form of an alert to an operator of the excavator instructing the operator to control the excavator to perform another payload discharge operation.

16. A non-transitory computer-readable storage medium having stored thereon instructions that, when executed by one or more processors, causes the one or more processors to perform a method comprising:

determining, based on signals from at least one sensor of a work machine, that the work machine is in a predetermined state to weigh a work tool of the work machine, the predetermined state to weigh the work tool of the work machine indicating a determined end of a work tool unloading operation for the work machine;

determining, automatically and without input by an operator of the work machine, the weight of the work tool under a condition where the work machine is in the state to weigh the work tool;

determining that the determined weight of the work tool is outside of a predetermined weight range; and electronically outputting information regarding a further action to be taken with respect to the work tool, wherein the further action includes one of inspecting the work tool, replacing some or all of the work tool, scheduling replacement of some or all of the work tool, updating one or more parameters corresponding to a different work tool that replaced the work tool associated with the determined weight, or performing a payload discharge operation, wherein said determining that the determined weight of the work tool is outside of the predetermined weight range involves the weight of the work tool decreasing by a predetermined amount indicative of damage or wear to the work tool, and wherein the predetermined state to weigh the work tool is a state in which the work tool is below a predetermined residual payload or carryback threshold, wherein said determining that the determined weight of the work tool is outside of the predetermined weight range involves the weight of the work tool decreasing by at least a predetermined amount, wherein the decrease in the weight of the work tool corresponds to damage to the work tool or wear over time of the work tool, the decrease in the determined weight of the work tool being above a predetermined weight change threshold for damage and below the predetermined weight change threshold for wear over time, and wherein said electronically outputting information regarding the further action to be taken with respect to the work tool includes information to repair or replace the work tool under the condition where the work tool is identified to be damaged or worn over time.

17. The non-transitory computer-readable storage medium according to claim 16, wherein said determining, automatically and without input by the operator of the work machine, the weight of the work tool under the condition where the work machine is in the state to weigh the work tool is performed with a portion of the work machine moving.

18. The non-transitory computer-readable storage medium according to claim 16, wherein the work tool is either a bucket or a grapple.

* * * * *